(12) United States Patent
McMillan et al.

(10) Patent No.: US 6,570,269 B2
(45) Date of Patent: May 27, 2003

(54) METHOD AND APPARATUS FOR SUPPLYING POWER TO A LOAD CIRCUIT FROM ALTERNATE ELECTRIC POWER SOURCES

(75) Inventors: Glenn McMillan, British Columbia (CA); Neil Sutcliffe, British Columbia (CA)

(73) Assignee: Xantrex International, St. Michael (BB)

( * ) Notice: Subject to any disclaimer, the term of this patent is extended or adjusted under 35 U.S.C. 154(b) by 233 days.

(21) Appl. No.: 09/819,113

(22) Filed: Mar. 27, 2001

(65) Prior Publication Data

US 2002/0057146 A1 May 16, 2002

Related U.S. Application Data

(60) Provisional application No. 60/239,918, filed on Oct. 13, 2000.

(51) Int. Cl.[7] .................................................. H02J 9/08
(52) U.S. Cl. ........................ 307/64; 307/64; 307/70; 307/125; 307/139; 307/140; 361/20; 361/62; 335/14; 335/20
(58) Field of Search .......................... 307/64, 125, 139, 307/140, 70; 361/20, 62; 200/175; 335/14, 20

(56) References Cited

U.S. PATENT DOCUMENTS

| | | | |
|---|---|---|---|
| 3,619,534 A | 11/1971 | Perkins | 200/168 G |
| 3,626,338 A | 12/1971 | Nicol et al. | 335/202 |
| 3,728,581 A | 4/1973 | Adamo | 317/18 A |
| 4,080,582 A | 3/1978 | Link | 335/37 |
| 4,178,572 A | * 12/1979 | Gaskill et al. | 335/14 |
| 4,725,799 A | * 2/1988 | Bratkowski et al. | 335/14 |
| 5,132,867 A | 7/1992 | Klancher | 361/62 |
| 5,285,180 A | 2/1994 | Rezac et al. | 335/202 |
| 5,761,027 A | * 6/1998 | Flegel | 361/664 |
| 5,907,461 A | 5/1999 | Hartzel et al. | 361/42 |

* cited by examiner

Primary Examiner—Brian Sircus
Assistant Examiner—Robert L. DeBeradinis
(74) Attorney, Agent, or Firm—Christensen O'Connor Johnson Kindness PLLC

(57) ABSTRACT

An apparatus and method for supplying power to a load circuit from main and alternate electric power sources involves actuating a signal-controlled selector inside a housing, at least a portion of which is received in a breaker receptacle of an electric power distribution panel such that a first conductor on the housing is operable to receive electric power from the electric power distribution panel and a second conductor on the housing is operable to receive electric power from an alternate electric power source, to selectively connect the load circuit to the first conductor on the housing or to a second conductor on the housing operable to receive electric power from an alternate electric power source, in response to a control signal.

58 Claims, 6 Drawing Sheets

METHOD AND APPARATUS FOR SUPPLYING POWER TO A LOAD CIRCUIT FROM ALTERNATE ELECTRIC POWER SOURCES

CROSS-REFERENCE TO RELATED APPLICATIONS

This application claims the benefit of U.S. Provisional Patent Application Ser. No. 60/239,918, filed Oct. 13, 2000.

BACKGROUND OF THE INVENTION

1. Field of the Invention

This invention relates to methods and apparatus for supplying power to a load circuit from main and alternate electric power sources.

2. Description of Related Art

Increasing numbers of critical appliances or devices such as computers, alarm systems or heating/cooling systems are being employed in commercial buildings and residences. Many of these appliances and/or devices require a continuous supply of electrical power. Most residential and commercial buildings are wired for AC electric power supplied only from a single utility electric power source. In some areas this utility electric power source can be unreliable or expensive. Consequently, it is desirable to be able to use alternate sources of electric power as backup electric power sources to ensure a continuous supply of electric power or as less expensive electric power sources.

Commonly, alternate electric power sources such as generators and inverters, for example, are wired to separate circuits and separate outlets or are used as alternate electric power sources to a conventional AC electric power distribution panel normally supplied with electrical power from an electric power utility. Connecting individual appliances to separate circuits or separate outlets is impractical, as a user would have to connect each appliance to an appropriate outlet to receive electric power from either the main electric power source or the alternate electric power source, as required. Many generators, for example, have built in AC receptacles by which they supply electric power but they can only accommodate a few appliances or devices at best.

Alternatively, individual devices or appliances can be wired directly to a separate electric power distribution system which may be connected to a transfer mechanism operable to receive electric power from first and second AC electric power sources. This is often done where critical load circuits are to be backed up by an alternate AC electric power source. These load circuits are usually removed from the main electrical panel and wired into a secondary sub-panel. This sub-panel is then powered through a manual transfer switch or automatic transfer switch for controlling electric power supplied to the entire secondary panel. When AC electric power failure occurs from the first source only those devices wired to the separate electric power distribution system are operable to draw electric power from the second AC electric power source. The main disadvantage of this system is that every device or appliance needing backup electric power must be wired to this special, separate electric power distribution system, which may require substantial re-wiring of circuits throughout a building. This has the additional disadvantage of limiting the locations the devices or appliances can be placed, and necessitates circuit rewiring when devices or appliances are moved. In addition, alternately sourcing an AC electric power distribution panel with an alternate source requires the ability to switch large currents which mandates the use of expensive high current switching equipment. Since commercial buildings are often renovated for new tenants, re-wiring for back-up of critical loads and providing an alternate electric power source could quickly become cost prohibitive. This can be a cost prohibitive barrier to market entry for back-up electric power alternative energy products.

In addition, there is currently no device which manages loads by controlling access to separate electric power feeds. Such a device could be useful in controlling energy costs where a user may select an electric power source based on the most economical rates.

What would be desirable therefore is a simple way of supplying certain load circuits normally supplied by an AC electric power distribution panel, with separate sources, in the event that AC electric power failure of the main source occurs or in the event that it is desired to supply a particular local circuit with an alternate source of electric power.

SUMMARY OF THE INVENTION

The above problems are addressed by providing a method for supplying power to a load circuit from main and alternate electric power sources. The method involves actuating a signal-controlled selector inside a housing, at least a portion of which is received in a breaker receptacle of an electric power distribution panel such that a first conductor on the housing is operable to receive electric power from the electric power distribution panel and a second conductor on the housing is operable to receive electric power from an alternate electric power source, to selectively connect the load circuit to the first conductor or to the second conductor, in response to a control signal.

The method may include causing relative movement between at least one of a transfer contact, a supply contact connected to the first conductor, and an alternate contact connected to the second conductor. This may include moving a plunger in communication with at least one of the transfer contact, the supply contact, and the alternate contact, which may further include imposing a magnetic force on the plunger. The method may also include producing a control signal and producing a magnetic force in response to the control signal. This may involve energizing a solenoid coil operable to produce the magnetic force on the plunger.

The method may also include protecting the load circuit from overload current, and may further include preventing current from being supplied to the load circuit when overload current is supplied to the load from either the panel or the alternate source. This may involve actuating a mechanism when the overload current is supplied to the load circuit, and separating contacts through which current is supplied to the load circuit in response to actuation of the mechanism.

The method may also include arming the mechanism in response to actuation of an exterior portion of an actuator of the mechanism extending outside of the housing, and engaging the contacts through which current is supplied to the load circuit in response to arming of the mechanism.

In accordance with another aspect of the invention there is provided an apparatus for supplying power to a load circuit from main and alternate electric power sources. The apparatus includes a housing having a first conductor thereon, at least a portion of the housing being receivable in a breaker receptacle to facilitate receipt of power from the main electric power source at the first conductor, a second conductor on the housing operable to receive electric power from an alternate electric power source, and means for selectively connecting the load circuit to the first conductor or to the second conductor, in response to a control signal.

The apparatus may include a transfer contact, a supply contact connected to the first conductor and an alternate contact connected to the second conductor and means for causing relative movement between at least one of the transfer contact, the supply contact and the alternate contact.

The apparatus may also include a plunger and means for moving the plunger into communication with at least one of the transfer contact, the supply contact and the alternate contact. The means for moving the plunger may include means for imposing a magnetic force on the plunger which may include a solenoid coil operable to be powered by the main electric power source.

The apparatus may further include protection means for protecting the load circuit from overload current, which may also include means for preventing current from being supplied to the load circuit when an overload current is supplied to the load circuit from either the main electric power source or the alternate electric power source.

The apparatus may further include an armable mechanism and means for actuating the mechanism when an overload current is supplied to the load circuit. The mechanism may be operable to positively separate contacts through which current is supplied to the load circuit in response to actuation of the mechanism. Means for arming the mechanism may also be included, which may include an actuator having an exterior portion extending outside of the housing. The mechanism may be operable to engage the contacts through which current is supplied to the load circuit in response to arming of the mechanism.

In accordance with another aspect of the invention, there is provided an apparatus for supplying power to a load circuit from a main electric power source or an alternate electric power source. The apparatus includes a housing having a first conductor thereon, at least a portion of the housing being receivable in a breaker receptacle to facilitate receipt of power from the main electric power source at the first conductor, a second conductor on the housing operable to receive electric power from an alternate electric power source, and a signal-controlled selector operable to connect the first conductor or the second conductor to the load circuit in response to a control signal.

The signal-controlled selector may include a selector contact arrangement, the first and second conductors being connected to the selector contact arrangement. The selector contact arrangement may further include a main contact operable to receive power from the first conductor, an alternate contact operable to receive power from the alternate source, and a transfer contact operable to be selectively connected to the main contact or the alternate contact.

The apparatus may further include a device operable to move the transfer contact between the supply contact and the alternate contact. The device may include a solenoid and a plunger movable in response to a magnetic force produced by the solenoid. The solenoid may be operable to receive power from the first conductor such that the solenoid can be energized by power from the main electric power source and de-energized when power is not available from the main electric power source.

The apparatus may also include a control operable to prevent movement of the plunger, and the control may include an interference member operable to interfere with movement of the plunger. An interference actuator may be included which is accessible from outside the housing and operable to cause the interference member to interfere with movement of the plunger.

The apparatus may further include an alternate source protector for protecting the load circuit from overload currents from the alternate source. The alternate source protector may include a positioner operable to position the alternate source contact in proximity with or away from the transfer contact. The positioner may include a movable member on which the alternate contact is situate, and a support for supporting the movable member in proximity with the transfer contact such that the transfer contact and the alternate contact can be engaged. The positioner may further include a spring for biasing the movable member away from the transfer contact.

The alternate source protector may include a current sensitive device operable to move the support away from the movable member, to permit the movable member to move away from the transfer contact such that the transfer contact is not able to engage the alternate contact. The current sensitive device may include a bimetallic member.

The apparatus may also include a main source protector for protecting the load circuit from overload current when the load circuit is being supplied with power from the main electric power source. The main source protector may include a main protection contact and a main inlet contact, at least one of which is movable relative to the other, and may further include a second current sensitive element operable to move the at least one of the main protection contact and the main inlet contact away from each other in response to overload current through the main protection contact.

The apparatus may also include a flexible main protection conductor supporting the main protection contact and a second heat sensitive element on the flexible main conductor arranged to cause the flexible main protection conductor to bend to effect movement of the main protection contact away from the main inlet contact.

A main source protector and an alternate source protector for protecting the load circuit from overload current may both be included in the apparatus. The apparatus may also include an actuator and an armable mechanism in communication with the alternate source protector and the main source protector, the actuator having an interior portion inside the housing and an exterior portion extending outside the housing, the exterior portion facilitating arming of the mechanism by movement of the exterior portion, the mechanism being disarmed by operation of either of the alternate source protector and the main source protector. The mechanism may be operable to open a set of contacts to prevent current from being supplied to the load from the main electric power source or from the alternate electric power source. Actuation of the actuator to arm the mechanism may be operable to engage the set of contacts to permit current to be supplied to the load from either the main electric power source or the alternate electric power source.

The apparatus may further include a signal generator for generating the control signal for controlling the signal-controlled selector, and may also include a main source protector for protecting the load circuit from overload current when the load circuit is being supplied with power from the main electric power source. The main source protector may include a main protection contact and a main inlet contact, at least one of which is movable relative to the other, and a second current sensitive element operable to move the at least one of the main protection contact and the main inlet contact away from each other in response to excessive current through the main protection contact. In addition, the apparatus may include a flexible main protection conductor supporting the main protection contact and a second heat sensitive element on the flexible main conductor arranged to cause the flexible main protection conductor to bend to effect movement of the main protection contact away from the main inlet contact.

The apparatus may also include an actuator and an armable mechanism in communication with the alternate source protector and the main source protector, the actuator having an interior portion inside the housing and an exterior portion extending outside the housing, the exterior portion facilitating arming of the mechanism by movement of the exterior portion.

In addition, the apparatus may include a first member connecting the actuator to the first current sensitive element such that movement of the first current sensitive element imparts movement to the actuator to disarm the mechanism, and a second member connecting the actuator to the second current sensitive element such that movement of the second current sensitive element imparts movement to the actuator to disarm the mechanism. The movement of the actuator which arms the mechanism may be operable to simultaneously engage the first protection contact with the alternate supply contact and to simultaneously engage the inlet contact with the main protection contact. Movement of the actuator which disarms the mechanism may be operable to disengage the first protection contact with the alternate supply contact and to disengage the inlet contact with the alternate protection contact.

Through use of the embodiments of the invention described herein, the need to rewire panels in existing buildings to supply circuits with alternate sources of electric power is removed. In addition, the need for a secondary sub-panel in new construction is removed. Furthermore, use of such embodiments provides for safer installation by having only one place within a given building to disconnect a load from AC electric power and by ensuring that backfeed of electric power into the utility or into the alternate source cannot occur.

Use of such embodiments of the invention also provides a competitive advantage in that rewiring an existing panel is no longer required. The cost of rewiring as compared to the cost of use of the modules described herein can be as high as 50 to 1, depending upon the access to the existing main AC electric power distribution panel.

Finally, in conventional high current systems which provide for switching of an electric power distribution panel feed from a conventional high current AC source to an alternate current source, transfer speeds are relatively slow because of the large ampere ratings of the relays required to be actuated. Furthermore, the distance required between contacts of this type of transfer device increases proportionately to the current carrying capacity. Even sub-panel transfer relays are relatively large and very slow, making them impractical for computers and process control equipment. Using the embodiments of the invention provided herein, transfer occurs at the load circuit level and therefore switching is done on currents of lesser magnitude which enables smaller components to be used, such smaller components having less mass and requiring less spacing than higher current apparatus, resulting in faster transfer speeds, rendering embodiments of the invention more suitable for use with computers and process control equipment.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
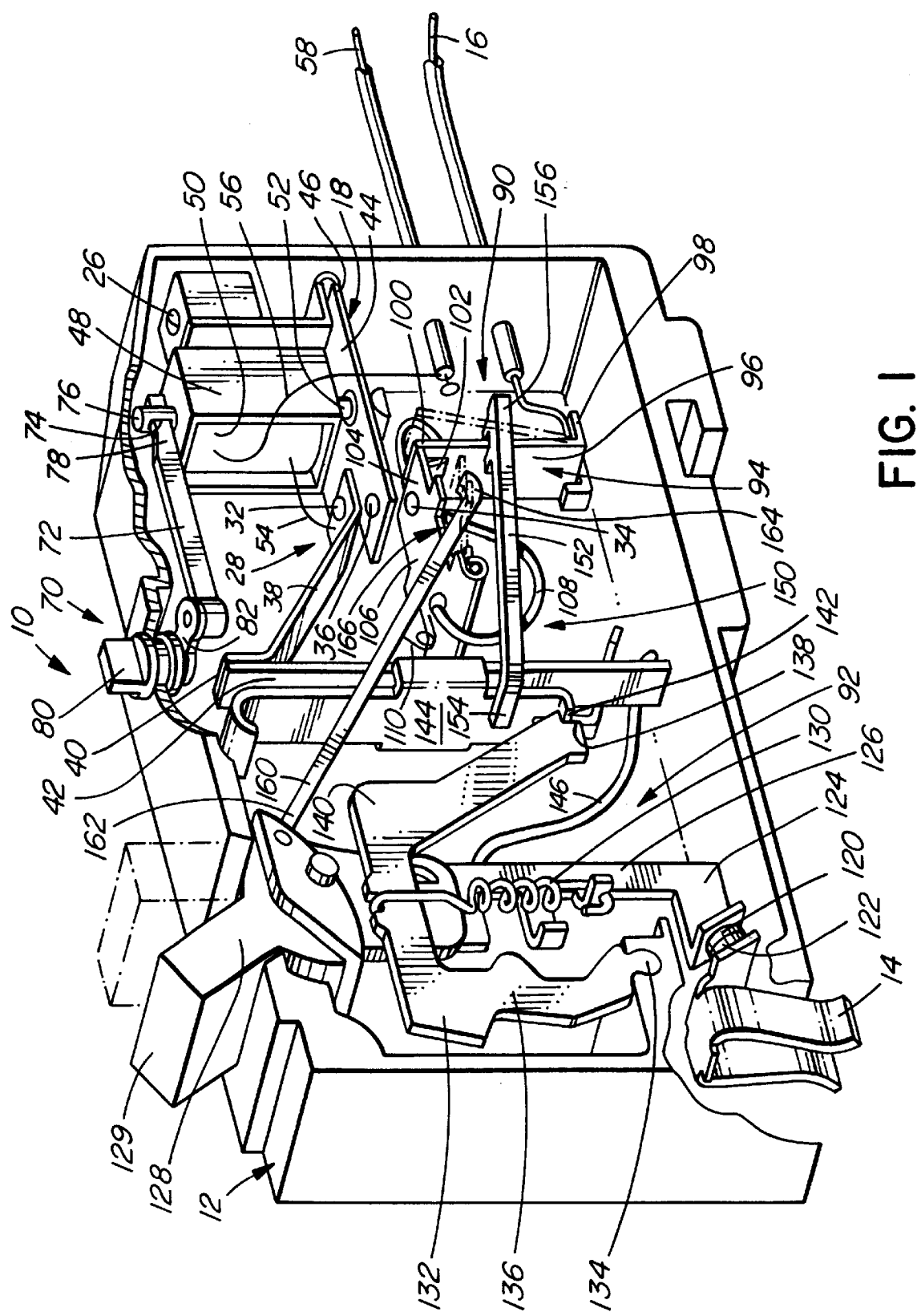
FIG. 1 is an oblique cutaway view of an apparatus for supplying power to a load circuit from alternate electric power sources according to a first embodiment of the invention.

Referring to FIG. 1, an apparatus for supplying electric power to a load circuit from alternate electric power sources, according to a first embodiment of the invention is shown generally at 10. The apparatus 10 includes a housing shown generally at 12 having a shape enabling at least a portion of the housing to be received in a breaker receptacle. The housing 12 has a first conductor 14 positioned on the housing to facilitate receipt of power from a main electric power source when the housing is received in the breaker receptacle and has a second conductor 16 thereon, operable to receive electric power from an alternate electric power source. Inside, the housing 12 has a signal controlled selector 18 for selectively connecting the load circuit to either the first conductor 14 or the second conductor 16, in response to a control signal.

Desirably the housing 12 has a shape or form factor of a breaker or circuit interrupter of a type that is in common usage to enable it to be received in a breaker receptacle in place of a conventional breaker or circuit interrupter to permit a conventional electric power distribution system to be expanded to provide for alternate sourcing of electric power, without requiring rewiring of an existing electric power distribution system.

Figure 2:
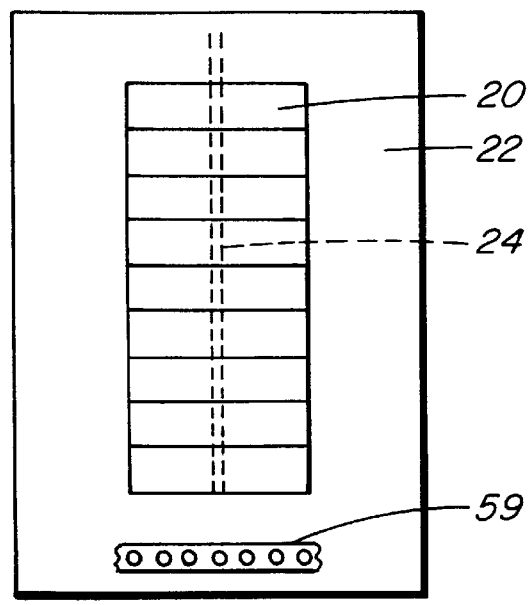
FIG. 2 is a schematic representation of a power distribution panel for receiving the apparatus shown in FIG. 1.

Referring to FIGS. 1 and 2, in this embodiment, the housing is shown as having a form factor of a conventional single-phase alternating current (AC) breaker which renders the apparatus useable as a replacement for a conventional breaker in a breaker receptacle 20 of a conventional single phase AC electric power distribution panel 22 in a typical residential or commercial application. For example, the apparatus may be used to replace Cutler-Hammer Type CH breakers and Square-D Type QO breakers or may replace type BR breakers produced by Cutler-Hammer, Murray, Siemens, I-T-E, General Electric, Bryant, Crouse-Hinds, Challanger, Square-D, Homeline and Thomas and Betts. In this embodiment, the first conductor 14 has the shape of a clip which is operable to engage a power bus 24 inside the AC distribution panel 22 to facilitate supply of power to the apparatus from the main electric power source. Thus, simply installing the housing 12 in the breaker receptacle 20 facilitates the automatic connection of the first conductor 14 to the main power source.

While the apparatus 10 is shown as being used for expanding a conventional single phase AC electric power distribution system, the apparatus may alternatively have a form factor enabling it to replace a breaker or circuit interrupter in a multiple phase AC power distribution system or a direct current (DC) electric power distribution system, for example.

Figure 3:
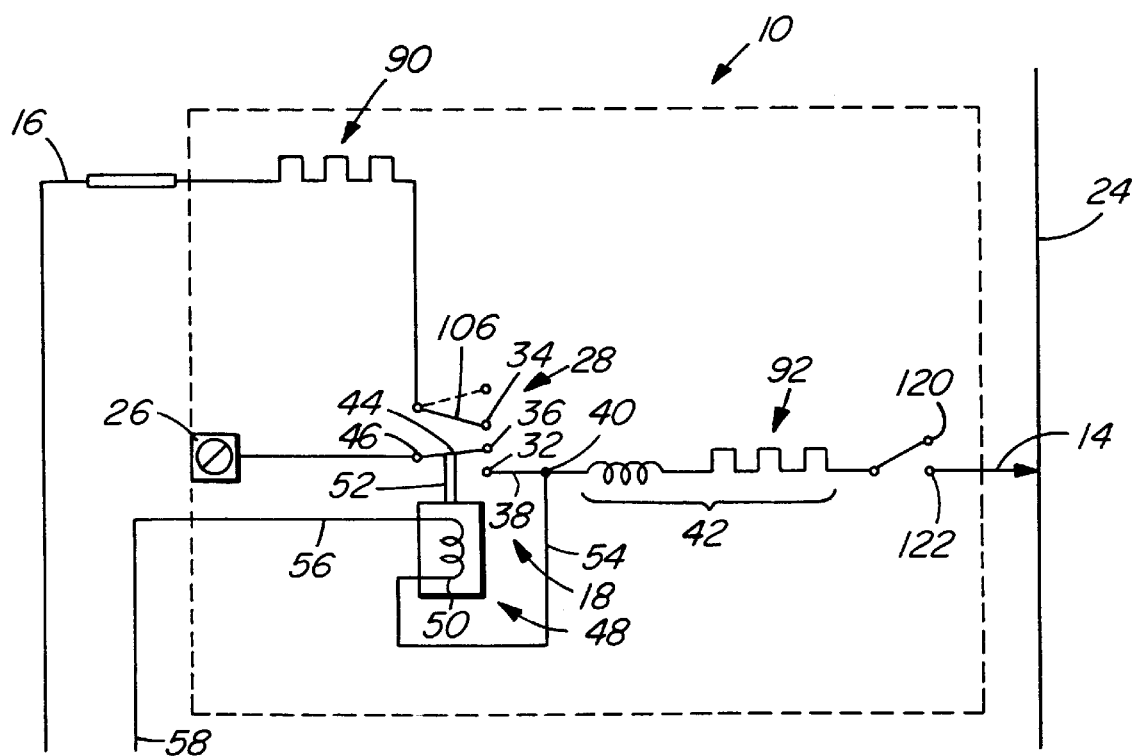
FIG. 3 is a schematic diagram of an electric circuit in the apparatus shown in FIG. 1.

Referring to FIG. 3, a schematic diagram of the apparatus of FIG. 1 is shown. Referring to FIGS. 1 and 3, the first conductor is shown at 14 and is operable to receive electric power from the power bus 24. The power bus 24 supplies AC electric power from a main electric power source, which in this embodiment is an AC electric power utility.

Referring to FIGS. 1 and 3, in this embodiment the second conductor 16, includes a pigtail wire lead formed of 14 American Wire Gauge (AWG) copper wire operable to receive electric power from an alternate source such as an electric power inverter or generator, (not shown) for example. The second conductor 16 may alternatively be a screw terminal or any other type of conductor termination device.

The signal-controlled selector is shown generally at 18 and is operable to electrically connect the first conductor 14 or the second conductor 16 to a load conductor 26, which in this embodiment includes a screw terminal on the housing. A load circuit or branch circuit of an electrical service may be connected to this terminal in the same manner that a load circuit is normally connected to a conventional circuit breaker, that is, by a wire, which is usually a 14 AWG solid copper wire. The signal-controlled selector 18 includes a selector contact arrangement 28 comprising a main contact 32 operable to receive power from the first conductor 14, an alternate contact 34 operable to receive power from the alternate source through the second conductor 16 and a transfer contact 36 operable to be selectively connected to the main contact 32 or the alternate contact 34. The main contact 32 is supported on a free end of a relatively rigid metallic conductor 38. An opposite end 40 of the metallic conductor 38 is rigidly secured to an overcurrent circuit interrupter 42 which ultimately receives power from the first conductor 14. The transfer contact 36 is mounted on a free end of a first flexible metallic conductor 44 rigidly secured at an opposite end 46 and electrically connected to the load conductor 26. The transfer contact 36 is moved by flexing the first flexible metallic conductor 44.

A device shown generally at 48 is operable to cause relative movement between at least one of the transfer contact 36, the main contact 32 and the alternate contact 34. In this embodiment, the device 48 includes a solenoid 50 fixed relative to the housing 12 and further includes a plunger 52 connected to the first flexible metallic conductor 44 approximately midway along its length and movable relative to the solenoid 50 in response to a magnetic force produced when current flows through the solenoid. Movement of the plunger causes movement of the first flexible metallic conductor 44, and hence movement of the transfer contact 36 between the main contact 32 and the alternate contact 34.

In this embodiment, the solenoid 50 is operable to receive power from the first conductor 14 such that the solenoid is energized by power from the main source and de-energized when power is not available from the main source. To enable the solenoid 50 to receive power from the main source, one lead 54 of the solenoid is connected to the main contact 32 and the other lead 56 is connected to a neutral conductor 58. In this embodiment, the neutral conductor 58 is a pigtail wire lead operable to be connected to a neutral bus of the AC power distribution panel 22 shown in FIG. 2. Referring back to FIGS. 1 and 3, when the solenoid 50 is energized, the plunger 52 is drawn toward the solenoid 50 whereupon the transfer contact 36 is engaged with the main contact 32. When the solenoid 50 is de-energized, a spring (not shown) returns the plunger 52 to its original position in which the transfer contact 36 is not in engagement with the main contact 32, but rather is in engagement with the alternate contact 34.

By making the transfer contact 36 and the first flexible metallic conductor 44 relatively lightweight, the time taken to transfer the load from the main contact 32 to the alternate contact 34, the transfer speed, may be in the range of 4 to 20 milliseconds, for example, which is faster than most high current switching devices. It will be appreciated that additional contact configurations such as dual and triple pole configurations may be used to provide signal-controlled selectors of this type for use with two and three phase systems and appropriate contact designs and ratings can be used for main and alternate power supplies in a DC power system.

Referring to FIG. 1, in this embodiment, the apparatus 10 also includes an optional control 70 which is operable to prevent movement of the plunger 52, thereby preventing movement of the transfer contact 36. The control 70 includes an interference member 72 which is operable to interfere with movement of the plunger 52. The plunger 52 has an opening 74 in an end portion 76 thereof and the interference member 72 has a tapered end 78 which is operable to be received in the opening 74. Through sliding movement of the interference member 72 the tapered end 78 is inserted into or retracted from the opening 74. When the tapered end 78 is received in the opening 74, movement of the plunger 52 is prevented and the transfer contact 36 is maintained in contact with the main contact 32. When the tapered end 78 is not received in the opening, movement of the plunger 52 is permitted.

The tapered end 78 is moved into and out of the opening 74 by operating an interference actuator 80 accessible from outside the housing 12. In this embodiment, the interference actuator 80 is simply a rotatable member with an arm 82 extending therefrom, the arm being pivotally connected to the interference member 72 to impart linear motion thereto in response to rotational movement of the interference actuator 80.

The interference actuator 80 may be user-actuable or may be controlled by any type of controller device, to effectively enable the load circuit to be connected to the alternate electric power source on an as required or as desired basis. For example, in an AC electric power distribution panel fitted with a plurality of apparatuses 10 of the type described herein, only apparatuses associated with critical circuits such as particular lighting, or computer circuits, for example, may have their interference actuators 80 previously placed in the non-interfering position in which case on loss of electric power from the main source loads connected to the load circuit are automatically supplied with electric power from the alternate electric power source. Other apparatuses may have their interference actuators 80 set to the interfering position, in which case the associated load circuit is not automatically supplied with power from the alternate source on loss of power from the main source. Rather, these load circuits are simply allowed to go dead. A user may selectively connect a load circuit to the alternate source by actuation of the corresponding interference actuator 80. Thus, in effect, the interference actuator 80 enables or disables a supply of electric power to the load circuit from the alternate electric power source.

Referring to FIGS. 1 and 3, the apparatus 10 further comprises a protection device for protecting the load circuit from overload current. In this embodiment, the protection device includes at least one of, and preferably both, an alternate source protector 90 and a main source protector 92 for preventing current from being supplied to the load circuit when an overload current is supplied to the load circuit from either the main electric power source or the alternate electric power source, thereby protecting the load circuit from overload current. In this embodiment, both are provided, but some applications may be suitable with one or the other.

Referring to FIG. 1, in this embodiment, the alternate source protector 90 includes a positioner 94 for positioning the alternate contact 34 in an operable position in proximity with or away from the transfer contact 36, respectively and a non-operable position, in response to sensing an overcurrent condition in the load circuit. In the operable position, the alternate contact 34 is held in close proximity to the transfer contact 36 such that the transfer contact is operable to contact it, when actuated by the action of the solenoid 50. In the non-operable position, the alternate contact 34 is positioned in a distanced position in which the alternate contact 34 is positioned away from the transfer contact 36 such that even with the action created by the solenoid 50, the transfer contact 36 cannot come into contact with the alternate contact.

To do this, the positioner 94 includes a movable support member, which in this embodiment includes a current sensitive device which in this embodiment includes a first flexible bimetallic member 96 having one end 98 rigidly secured to the housing 12 and a second end 100 which is operable to move due to flexing of the first bimetallic member. The first bimetallic member 96 has a support 102 on its second end 100, for supporting an end portion 104 of a movable member 106 on which the alternate contact 34 is formed, in proximity with the transfer contact 36 such that the alternate contact 34 can be engaged with the transfer contact 34. The second conductor 16 is connected to the rigidly secured end 98 of the first flexible bimetallic member 96 and a high current conductor 108 is connected between the second end 100 of the first bimetallic member 96 and the movable member 106. This ensures that current flowing through the second conductor 16 flows through the first flexible bimetallic member 96.

The first flexible bimetallic member 96 heats up in response to overload current therethrough, causing it to flex, or rotate into the position shown in broken outline in FIG. 1. This moves the support 102 for the movable member 106 away from the movable member 106 such that the end portion 104 of the movable member is no longer supported. A spring 110 is connected to the movable member 106 and biases it to flex or rotate into the non-operative position shown in broken outline in FIG. 1 such that the transfer contact 36 is not operable to engage the alternate contact 34. In this way, overload current through the second conductor 16 causes the alternate contact 34 to be moved into the non-operative position, where current flow to the load circuit is interrupted, thereby protecting the load circuit from overload currents.

The main source protector 92 includes a main protection contact 120 and a main inlet contact 122, at least one of which is movable relative to the other. The main inlet contact 122 is part of the clip which acts as the first conductor 14. In this embodiment, the main protection contact 120 is on an end 124 of an overcenterable link member 126 which is connected to a rotatable actuator 128. The actuator 128 has a handle 129 which extends out of the housing 12, for actuation by a user, to enable the user to rotate the actuator to place the link member 126 in an overcenter position which is shown in FIG. 1. The link member 126 is held in the overcenter position by a spring 130 connected to a latching member 132 which is rotatable relative to the housing 12, about a first end 134 of a first arm 136 thereof. A second end 138 of a second arm 140 of the latching member 132 engages a tab 142 on a movable member 144. The movable member 144 is a movable portion of the overcurrent circuit interrupter 42 which, in this embodiment, is a heat sensitive and magnetically sensitive device as commonly found in conventional AC circuit breakers. The overcurrent circuit interrupter 42 is electrically connected by a high current conductor 146 to the main protection contact 120 such that current flow through the main protection contact 120 must flow through the overcurrent circuit interrupter 42. The overcurrent circuit interrupter 42 is arranged such that movement imparted to the movable member 144 in response to sensing an overcurrent condition, causes the movable member 144 to move such that the tab 142 no longer engages the second end 138 of the latching member 132. When this occurs the energy stored in the spring 130 is released, causing the linkage formed by the actuator 128 and the link member 126 to be snapped out of the overcenter position, thereby separating the contacts 120 and 122. This causes current flow from the first conductor 14 to the load conductor 26 to be interrupted, thereby protecting the load circuit from overload currents. Effectively, the overcenterable link member 126, actuator 128, latching member 132 and spring 130 act as an armable mechanism. The handle 129 of the actuator 128 is operable to arm the armable mechanism to engage the contacts 120 and 122 and the movable member operates to actuate the armable mechanism when an overload current is supplied to the load circuit, to cause the contacts 120 and 122 to be separated.

In this embodiment, the apparatus 10 is further provided with a transfer mechanism 150, for transferring movement created by one of the main and alternate source protectors 92 and 90, to the other. In this embodiment, the transfer mechanism 150 includes a dual acting arm 152 having a first end 154 secured to the movable member 144 of the main source protector 92 and a second end 156 engaged with the first bimetallic member 96 of the alternate source protector 90. Thus, when the first bimetallic member 96 moves into the position shown in broken outline, wherein a connection between the alternate contact 34 and the transfer contact 36 is prevented, the arm 152 pulls the movable member 144 and hence the tab 142 out of engagement with the second end 138 of the latching member 132 of the main source protector 92, thereby tripping the overcenter linkage and separating the contacts 120 and 122. Thus, the load is prevented from receiving power from both the alternate supply and the main supply.

Similarly, if an overload current condition is sensed by the overcurrent circuit interrupter 42, the movable member 144 moves, releasing the second end 138 of the latching member 132 and separating the contacts 120 and 122 and such movement is transferred to the first bimetallic member 96, causing the support 102 to cease supporting the end portion 104 of the movable member 106, thereby permitting the spring to move the movable member 106 and hence the alternate contact 34 into the non-operational position shown in broken outline. Thus, no matter which protector 90 or 92 senses an excess current condition, both protectors 90 and 92 are actuated to prevent power from any source being supplied to the load circuit.

The transfer mechanism 150 also includes a reset arm 160 having a first end 162 connected to the actuator and a second end 164 guided for engagement with the movable member 106. The movable member 106 has a guide slot 166 formed therein for guiding the reset arm 160, such that when the actuator 128 is rotated into the position shown in broken outline in FIG. 1, the second end 164 of the reset arm is only loosely held by the movable member 106 allowing the movable member to be fully retracted by its spring, into the non-operative position, thereby ensuring that no power can flow from the alternate contact 34 to the transfer contact 36. When the actuator 128 is rotated to the position shown in solid outline, the second end 164 of the reset arm 160 bears upon the movable member 106 pulling it back into the operative position shown in FIG. 1 until it is supported by the support 102 whereupon the end portion 104 of the reset arm 160 is again loosely held by the movable member 106. It is assumed that when the actuator 128 is rotated, the first bimetallic member 96 has cooled and has returned to its original position. It is also assumed that the movable member 144 has also returned to its original position. Thus, the first bimetallic member 96 is repositioned to enable the support 102 to support the movable member 106 and the movable member 144 is repositioned to enable it to engage the second end 138 of the second arm 140 of the latching member 132.

Figure 4A:
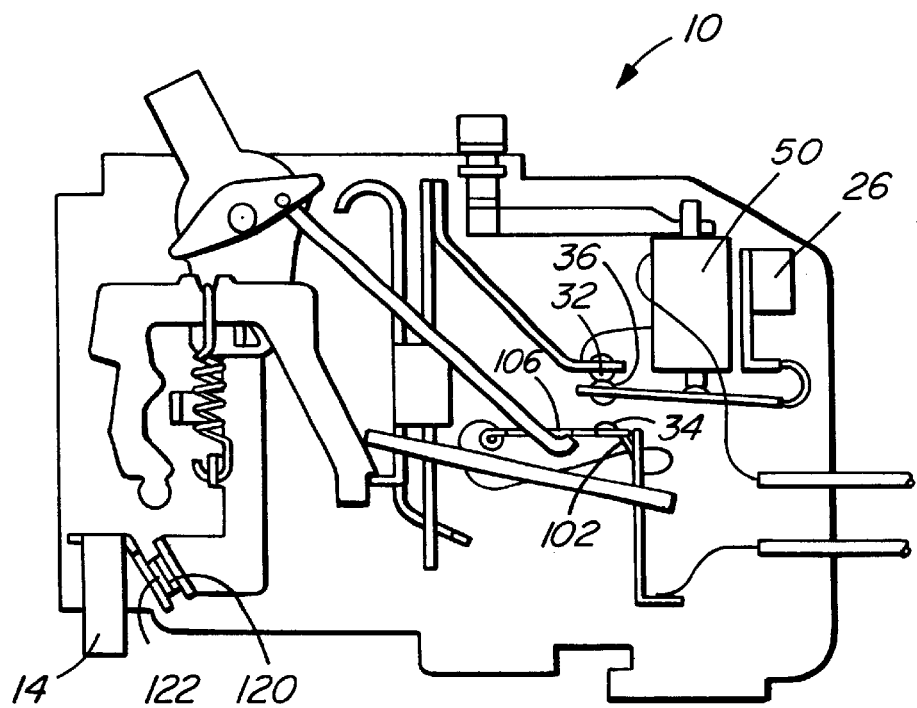
FIGS. 4A–F are schematic diagrams of various modes of operation of the apparatus shown in FIG. 1.

Referring to FIGS. 4A–F, the various operations of the protectors and contacts are illustrated. FIG. 4A shows the apparatus 10 in its normal operating state. The main contacts 120 and 122 are engaged, the solenoid 50 is energized by the main supply such that the main contact 32 is in contact with the transfer contact 36 and the movable member 106 is supported by the support 102 such that the alternate contact 34 is in the operative position. Current flows from the first conductor 14 to the load conductor 26.

Figure 4B:
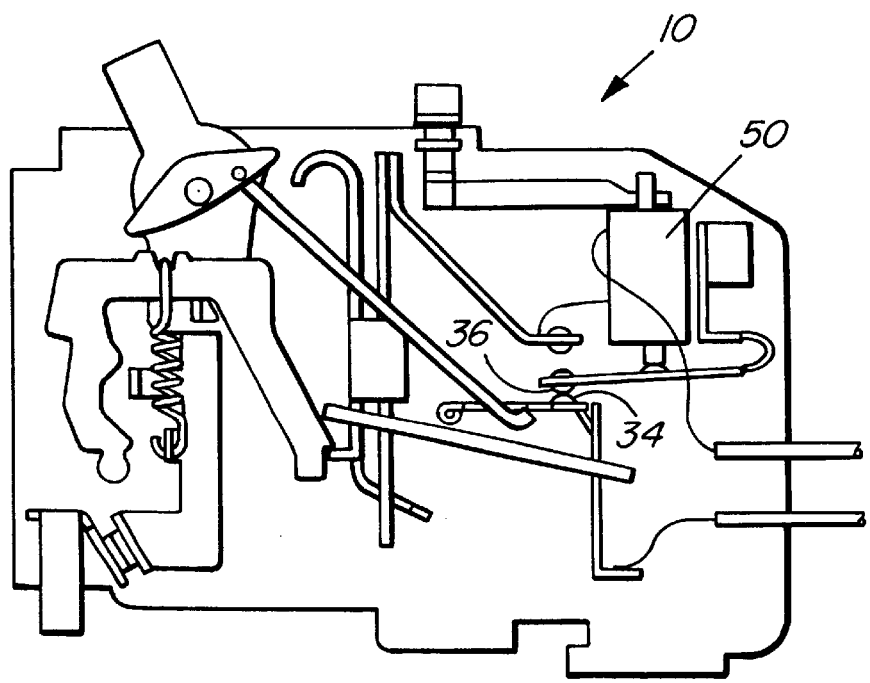

FIG. 4B illustrates the condition that occurs when the apparatus 10 has been operating in the normal state shown in FIG. 4A and power from the main supply is interrupted, such as would occur in the event of a main power outage. The loss of power from the main supply de-energizes the solenoid 50 and the spring in the solenoid forces the transfer contact 36 into engagement with the alternate contact 34. Power is thus supplied to the load from the alternate source. In the event that power is restored to the main supply, the solenoid 50 is re-energized and the apparatus is returned to the state shown in FIG. 4A and resumes normal operation.

Figure 4C:
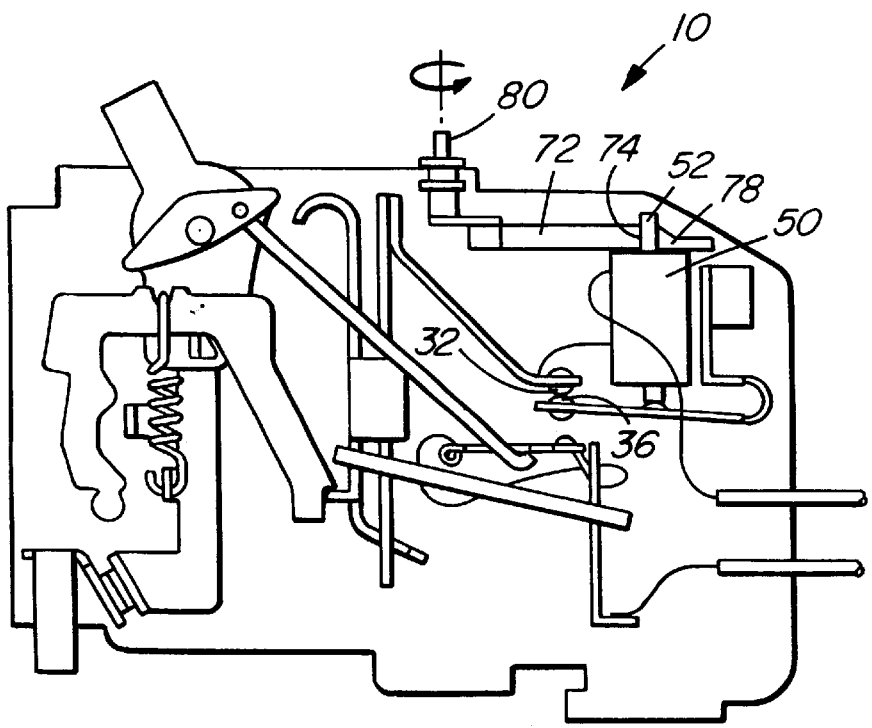

FIG. 4C shows the apparatus 10 in the normal state of operation, but with the interference actuator 80 rotated into the main only mode, wherein the tapered end 78 of the interference member 72 is fully received through the opening 74 in the plunger 52 to prevent the plunger from moving under the action of the spring in the solenoid 50 in the event of main power loss. Thus in the event of main power loss, the state shown in FIG. 4B cannot be attained, but rather, the main contact 32 and the transfer contact 36 remain in engagement, even though no power is being supplied to the solenoid 50. In this mode, the alternate supply cannot supply power to the load circuit because the plunger 52 and hence the transfer contact 36 is restricted from moving.

Figure 4D:
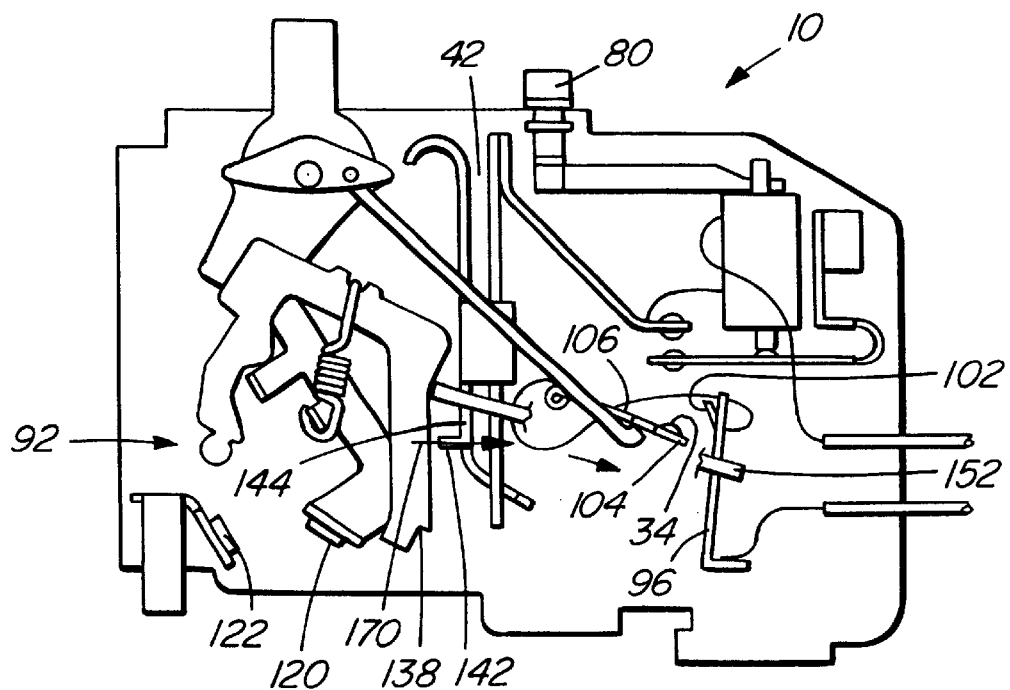

FIG. 4D shows the apparatus 10 in a state which occurs just after the main source protector 92 is operated and the interference actuator 80 is in an enable alternate mode. When overload current flows through the contacts 120 and 122 and into the overcurrent circuit interrupter 42 with sufficient power to trip either the first bimetallic member 96 and/or the magnetic sensor therein, the movable member 144 is sufficiently moved in the direction of arrow 170, thereby disengaging the tab 142 with the second end 138, causing the over center linkage to trip, thereby separating the contacts 120 and 122. At the same time, movement of the movable member 144 is imparted, by the arm 152, to the first bimetallic member 96. This removes the support 102 for the end portion 104 of the movable member 106, allowing the spring to rotate the movable member 106 to move the alternate contact 34 into the non-operative position. Thus, while the overcurrent condition was sensed by the main source protector 92, both the main protector contact 122 and the alternate contact 34 are moved away from their respective mating contacts to prevent current from being supplied from any source.

Figure 4E:
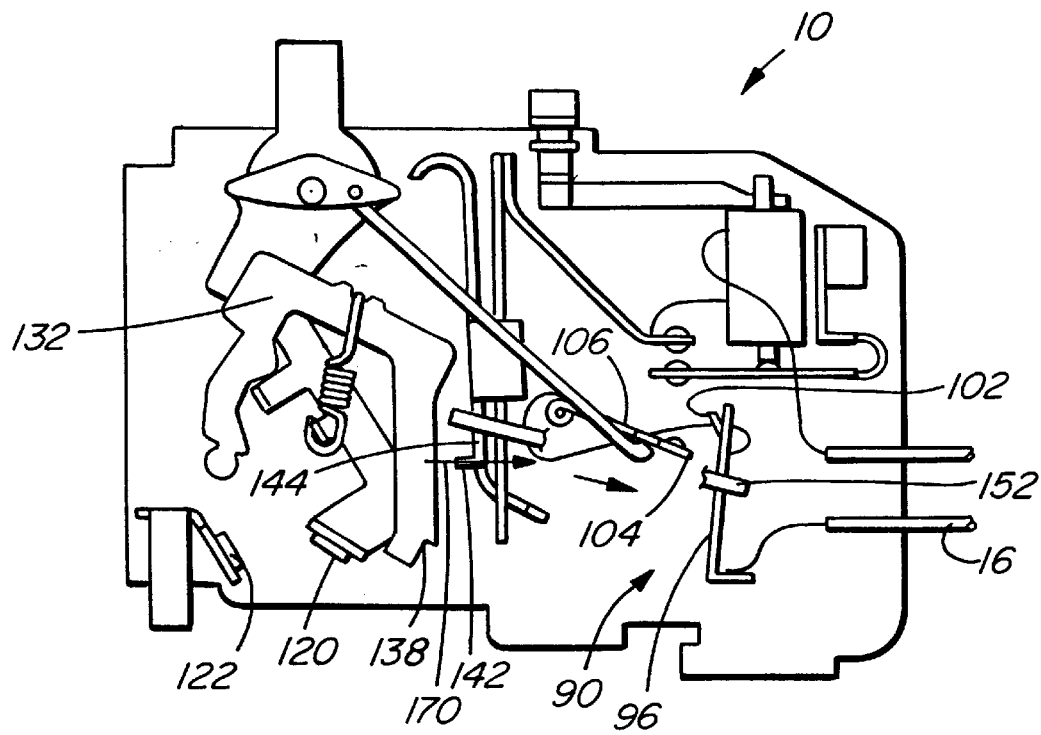

FIG. 4E shows the apparatus 10 in a state which occurs just after the alternate protector 90 is operated. When overload current flows from the alternate source conductor 16 through the first bimetallic member 96, the support 102 is moved away, thereby removing the support 102 for the end portion 104 of the movable member 106, allowing the spring to pull the movable member 106 into the non-operative position. At the same time, movement of the first bimetallic member 96 is imparted, by the arm 152, to the movable member 144 such that the movable member 144 is sufficiently moved in the direction of arrow 170, thereby disengaging the tab 142 with the second end 138 of the latching member 132, causing the over center linkage to trip, thereby separating the contacts 120 and 122. Again, current from any source is prevented from reaching the load circuit.

Figure 4F:
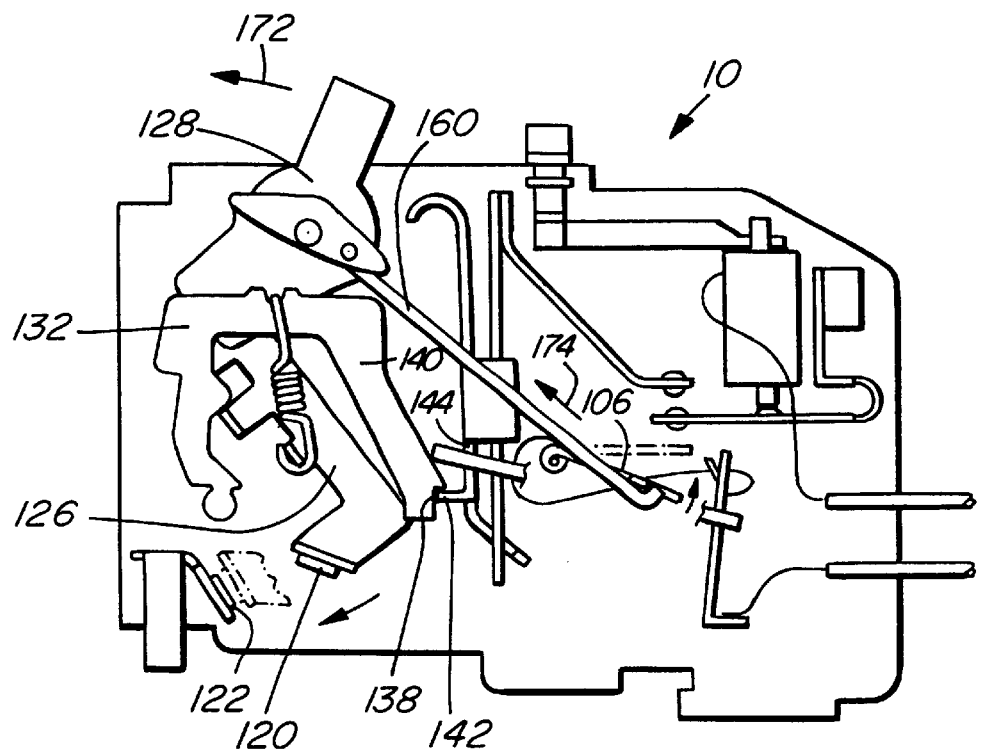

FIG. 4F shows the apparatus 10 in a reset state which is achieved when the user rotates the actuator 128 into the position shown. Rotating the actuator 128 into this position causes the second end 138 of the second arm 140 of the latching member 132 to engage with the tab 142 on the movable member 144. When the actuator 128 is rotated in the direction shown by arrow 172 the reset arm 160 is moved in the direction shown by arrow 174 and pulls the movable member 106 upwardly into the position shown in broken outline in FIG. 4F and shown in solid outline in FIG. 4A. At the same time, movement of the actuator 128 causes the link member 126 to move into the overcenter position in which the contacts 120 and 122 are engaged, as shown in broken outline in FIG. 4F.

One advantage of the embodiment shown in FIGS. 1 and 3 is that fault clearing contacts of the main and alternate source protectors 90 and 92 are positioned nearest their respective sources and thus the high fault clearing capabilities of these overload current protectors can protect the main transfer, and alternate contacts 32, 36 and 34. This embodiment is also more likely to meet with regulatory approval.

Figure 5:
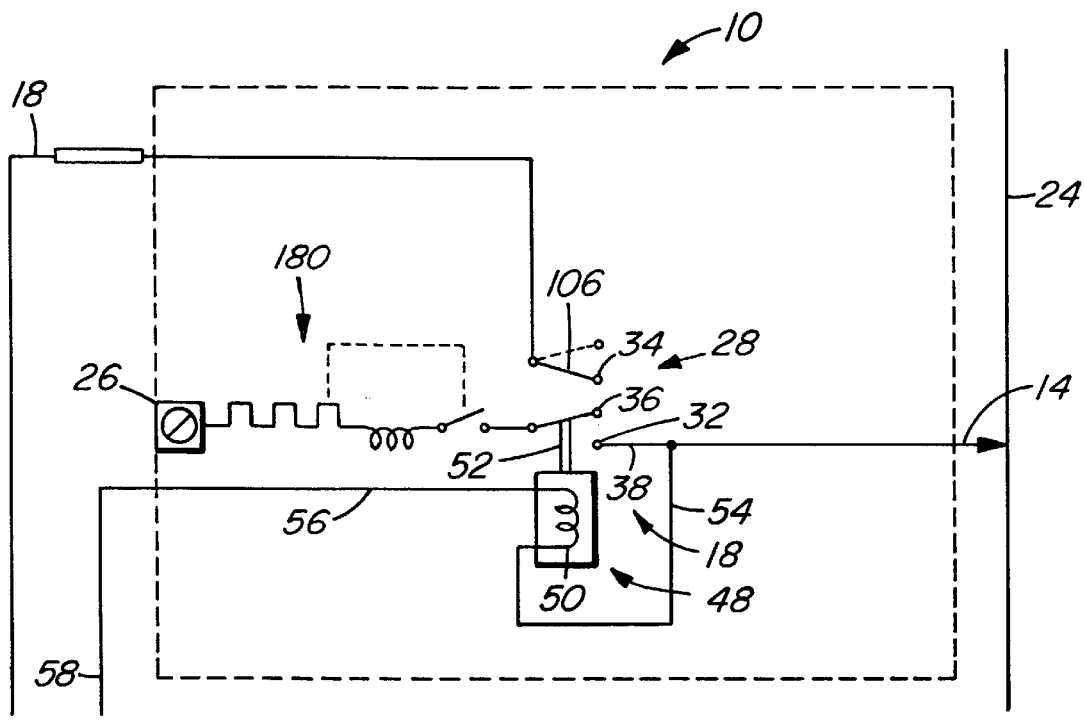
FIG. 5 is a schematic diagram of an electric circuit in the apparatus shown in FIG. 1 according to a second embodiment of the invention.

Referring to FIG. 5, a schematic diagram of an alternative circuit arrangement is shown. The components of this embodiment are generally similar to the components described in connection with the first embodiment shown in FIGS. 1 and 3 and like components are designated with the same numerical references as in the first embodiment. In this embodiment, there is only one circuit protector 180 and it is connected in series between the transfer contact 36 and the load conductor 26. In this embodiment, the load circuit protector 180 may be of the type shown in connection with the main source protector 92 shown in FIG. 1, for example, or may include any types of circuit protectors, including fuses, or circuit breaker mechanisms, for example. The circuit shown in FIG. 5 can be implemented using the apparatus shown in FIG. 1 simply by removing the inlet contact 122 from the first conductor 14 and connecting a high current wire from the first conductor 14 directly to the metallic conductor 38 and connecting a second wire from the movable member 106 directly to the second conductor 16. A third conductor may then be connected from the first flexible metallic conductor 44 to the main protection contact 120 and a fourth wire may be connected from the main inlet contact 120 to the load terminal 26. Alternatively, the configuration of components inside the housing 12 may be rearranged, as desired, to achieve the functionality provided by the components shown in the schematic diagram of FIG. 5.

Figure 6:
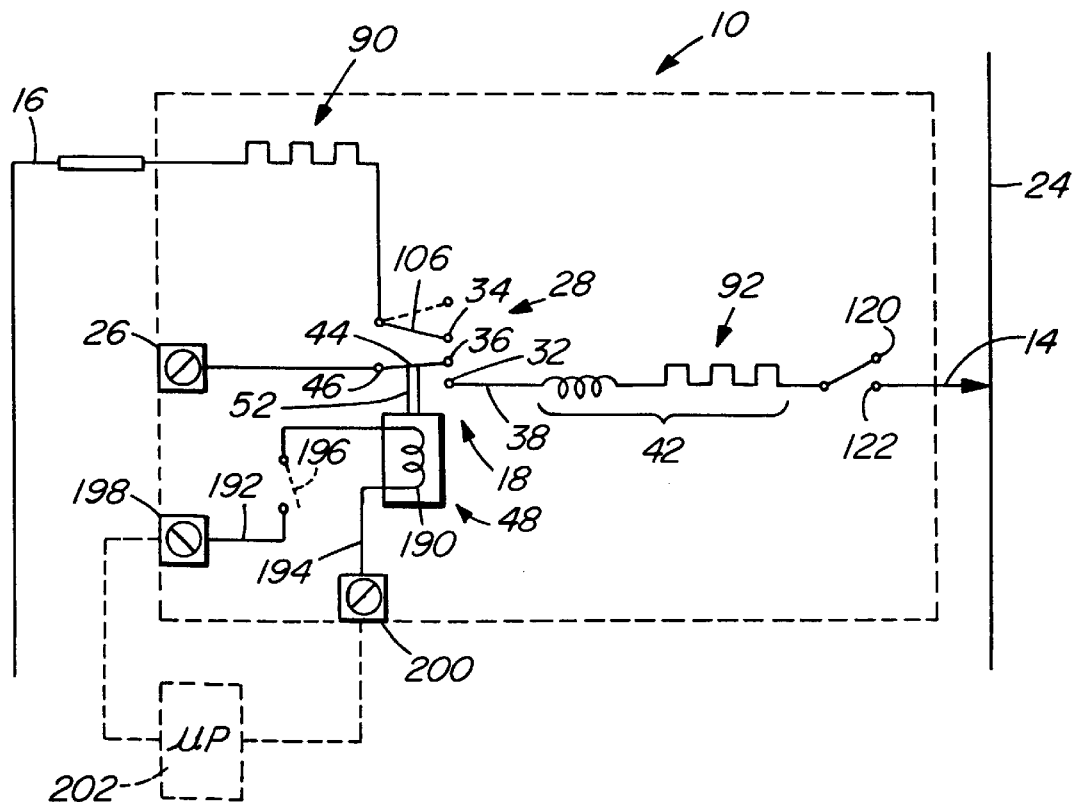
FIG. 6 is a schematic diagram of an electric circuit in the apparatus shown in FIG. 1 according to a third embodiment of the invention.

Referring to FIG. 6, an alternative circuit arrangement may be employed in the housing 12 of FIG. 1, according to a third embodiment of the invention. The components of this embodiment are generally similar to the components described in connection with the first embodiment shown in FIGS. 1 and 3 and like components are designated with the same numerical references as in the first embodiment. In this third embodiment, however, the signal-controlled selector 18, has a DC coil 190 with first and second leads 192 and 194 for conducting direct current through the coil 190. In this embodiment, the coil 190 is a low current coil which permits a low voltage DC electric control signal to be used to energize the coil 190 to move the plunger 52 to connect the transfer contact 36 to either the main contact 32 or the alternate contact 34.

The DC coil 190 may be configured to maintain the transfer contact 36 in contact with the main contact 32 when the coil is unenergized or energized. If the DC coil 190 is normally operated in the unenergized state, a separate switch shown in broken outline at 196 may be easily used as an alternative to the control 70 shown in FIG. 1 to control whether or not the transfer contact 36 in maintained in contact with either the main contact 32 or the alternate contact 34.

The DC coil 190 may be of the type that requires a continuous DC energization signal to maintain the plunger 52 and hence the transfer contact 36 in a given state. Alternatively, the DC coil 190 may include a mechanical latching mechanism, which latches the plunger 52 and hence the transfer contact 36 in a desired position, in response to a momentary signal received at the coil.

Control signals for actuating the coil 190 may be supplied to terminals 198 and 200 connected to the first and second leads 192 and 194 respectively. Such signals may be provided by a controller, such as a microprocessor control circuit 202, which provides for selective actuation of the coil 190 to selectively choose the source of power for the load circuit. A microprocessor control circuit may be contained in the housing 12 shown in FIG. 1, or may reside outside of the housing as a remote controller. For example, the microprocessor may be on a power inverter. Thus, a microprocessor or microcontroller or other processor circuit may be used in conjunction with the apparatus described herein for AC load management, particularly where a plurality of such apparatus of the type described and used to supply a plurality of respective load circuits.

While specific embodiments of the invention have been described and illustrated, such embodiments should be considered illustrative of the invention only and not as limiting the invention as construed in accordance with the accompanying claims.

What is claimed is:

1. A method for supplying power to a load circuit from main and alternate electric power sources, the method comprising actuating a signal-controlled selector inside a housing, at least a portion of which is received in a breaker receptacle of an electric power distribution panel such that a first conductor on said housing is operable to receive electric power from said electric power distribution panel and a second conductor on said housing is operable to receive electric power from an alternate electric power source, to selectively connect the load circuit to said first conductor or to said second conductor, in response to a control signal.

2. The method of claim 1 further comprising causing relative movement between at least one of a transfer contact, a supply contact connected to said first conductor, and an alternate contact connected to said second conductor.

3. The method of claim 2 wherein causing relative movement comprises moving a plunger in communication with at least one of said transfer contact, said supply contact, and said alternate contact.

4. The method of claim 3 wherein moving a plunger comprises imposing a magnetic force on said plunger.

5. The method of claim 4 further comprising producing said magnetic force in response to said control signal.

6. The method of claim 5 further comprising producing said control signal.

7. The method of claim 6 wherein producing said magnetic force comprises energizing a solenoid operable to produce said magnetic force on said plunger.

8. The method of claim 1 further comprising protecting said load circuit from overload current.

9. The method of claim 8 further comprising preventing current from being supplied to said load circuit when overload current is supplied to said load from either said panel or said alternate source.

10. The method of claim 9 further comprising actuating a mechanism to interrupt the flow of current to said load circuit when said overload current is supplied to said load circuit.

11. The method of claim 10 further comprising separating contacts through which current is supplied to said load circuit in response to actuation of said mechanism.

12. The method of claim 10 further comprising arming said mechanism in response to actuation of an exterior portion of an actuator of said mechanism extending outside of said housing.

13. The method of clam 12 further comprising engaging said contacts through which current is supplied to said load circuit in response to arming of said mechanism.

14. An apparatus for supplying power to a load circuit from main and alternate electric power sources, the apparatus comprising:
 a housing having a first conductor thereon, at least a portion of said housing being receivable in a breaker receptacle to facilitate receipt of power from the main electric power source at said first conductor;
 a second conductor on said housing operable to receive electric power from an alternate electric power source,
 means for selectively connecting the load circuit to said first conductor or to said second conductor, in response to a control signal.

15. The apparatus of claim 14 further comprising a transfer contact, a supply contact connected to said first conductor and an alternate contact connected to said second conductor and means for causing relative movement between at least one of said transfer contact, said supply contact and said alternate contact.

16. The apparatus of claim 15 further comprising a plunger and means for moving said plunger into communication with at least one of said transfer contact, said supply contact and said alternate contact.

17. The apparatus of claim 16 wherein the means for moving said plunger comprises means for imposing a magnetic force on said plunger.

18. The apparatus of claim 17 wherein the means for imposing a magnetic force comprises a solenoid operable to be powered by said main electric power source.

19. The apparatus of claim 14 further comprising protection means for protecting said load circuit from overload current.

20. The apparatus of claim 19 wherein said protection means comprises means for preventing current from being supplied to said load circuit when an overload current is supplied to said load circuit from either said main electric power source or said alternate electric power source.

21. The apparatus of claim 20 further comprising an armable mechanism and means for actuating said mechanism when an overload current is supplied to said load circuit, said mechanism being operable to positively separate contacts through which current is supplied to said load circuit in response to actuation of said mechanism.

22. The apparatus of claim 21 further comprising means for arming said mechanism.

23. The apparatus of claim 22 wherein said means for arming comprises an actuator having an exterior portion extending outside of said housing.

24. The apparatus of clam 23 wherein said mechanism is operable to engage said contacts through which current is supplied to said load circuit in response to arming of said mechanism.

25. An apparatus for supplying power to a load circuit from a main electric power source or an alternate electric power source, the apparatus comprising:
a housing having a first conductor thereon, at least a portion of said housing being receivable in a breaker receptacle to facilitate receipt of power from the main electric power source at said first conductor;
a second conductor on said housing operable to receive electric power from an alternate electric power source,
a signal-controlled selector operable to connect said first conductor or said second conductor to the load circuit in response to a control signal.

26. The apparatus of claim 25 wherein said signal-controlled selector comprises a selector contact arrangement, said first and second conductors being connected to said selector contact arrangement.

27. The apparatus of claim 26 wherein said selector contact arrangement comprises a main contact operable to receive power from said first conductor, an alternate contact operable to receive power from said alternate source, and a transfer contact operable to be selectively connected to said main contact or said alternate contact.

28. The apparatus of claim 27 further comprising a device operable to move said transfer contact between said supply contact and said alternate contact.

29. The apparatus of claim 28 wherein said device comprises a solenoid and a plunger movable in response to a magnetic force produced by said solenoid.

30. The apparatus of claim 29 wherein said solenoid is operable to receive power from said first conductor such that said solenoid can be energized by power from said main electric power source and de-energized when power is not available from said main electric power source.

31. The apparatus of claim 30 further comprising a control operable to prevent movement of the plunger.

32. The apparatus of claim 31 wherein said control comprises an interference member operable to interfere with movement of said plunger.

33. The apparatus of claim 32 further comprising an interference actuator accessible from outside said housing and operable to cause said interference member to interfere with movement of said plunger.

34. The apparatus of claim 25 further comprising an alternate source protector for protecting said load circuit from overload currents from said alternate source.

35. The apparatus of claim 34 wherein said alternate source protector comprises a positioner operable to position said alternate source contact in proximity with or away from said transfer contact.

36. The apparatus of claim 35 wherein said positioner comprises a movable member on which said alternate contact is situate.

37. The apparatus of claim 36 wherein said positioner comprises a support for supporting said movable member in proximity with said transfer contact such that said transfer contact and said alternate contact can be engaged.

38. The apparatus of claim 37 wherein said alternate source protector comprises a current sensitive device operable to move said support away from said movable member, to permit said movable member to move away from said transfer contact such that said transfer contact is not able to engage said alternate contact.

39. The apparatus of claim 38 wherein said current sensitive device comprises a bimetallic member.

40. The apparatus of claim 38 wherein said positioner further comprises a spring for biasing said movable member away from said transfer contact.

41. The apparatus of claim 25 further comprising a main source protector for protecting said load circuit from overload current when said load circuit is being supplied with power from said main electric power source.

42. The apparatus of claim 41 wherein said main source protector comprises a main protection contact and a main inlet contact, at least one of which is movable relative to the other.

43. The apparatus of claim 42 wherein said main source protector comprises a second current sensitive element operable to move said at least one of said main protection contact and said main inlet contact away from each other in response to overload current through said main protection contact.

44. The apparatus of claim 43 further comprising a flexible main protection conductor supporting said main protection contact and a second heat sensitive element on said flexible main conductor arranged to cause said flexible main protection conductor to bend to effect movement of said main protection contact away from said main inlet contact.

45. The apparatus of claim 25 further comprising a main source protector and an alternate source protector for protecting said load circuit from overload current.

46. The apparatus of claim 45 further comprising an actuator and an armable mechanism in communication with said alternate source protector and said main source protector, said actuator having an interior portion inside said housing and an exterior portion extending outside said housing, said exterior portion facilitating arming of said mechanism by movement of said exterior portion, said mechanism being disarmed by operation of either of said alternate source protector and said main source protector.

47. The apparatus of claim 46 wherein said mechanism is operable to open a set of contacts to prevent current from being supplied to said load from said main electric power source or from said alternate electric power source.

48. The apparatus of claim 47 wherein actuation of said actuator to arm said mechanism is operable to engage said set of contacts to permit current to be supplied to said load from either said main electric power source or said alternate electric power source.

49. The apparatus of claim 25 further comprising a signal generator for generating said control signal for controlling said signal-controlled selector.

50. The apparatus of claim 35 further comprising a main source protector for protecting said load circuit from overload current when said load circuit is being supplied with power from said main electric power source.

51. The apparatus of claim 50 wherein said main source protector comprises a main protection contact and a main inlet contact, at least one of which is movable relative to the other.

52. The apparatus of claim 51 wherein said main source protector comprises a second current sensitive element operable to move said at least one of said main protection contact and said main inlet contact away from each other in response to overload current through said main protection contact.

53. The apparatus of claim 52 further comprising a flexible main protection conductor supporting said main protection contact and a second heat sensitive element on said flexible main conductor arranged to cause said flexible main protection conductor to bend to effect movement of said main protection contact away from said main inlet contact.

54. The apparatus of claim 53 further comprising an actuator and an armable mechanism in communication with said alternate source protector and said main source protector, said actuator having an interior portion inside said housing and an exterior portion extending outside said housing, said exterior portion facilitating arming of said mechanism by movement of said exterior portion.

55. The apparatus of claim 54 further comprising a first member connecting said actuator to said first current sensitive element such that movement of said first current sensitive element imparts movement to said actuator to disarm said mechanism.

56. The apparatus of claim 55 further comprising a second member connecting said actuator to said second current sensitive element such that movement of said second current sensitive element imparts movement to said actuator to disarm said mechanism.

57. The apparatus of claim 56 wherein movement of said actuator which arms said mechanism is operable to simultaneously engage said first protection contact with said alternate supply contact and to simultaneously engage said inlet contact with said main protection contact.

58. The apparatus of claim 57 wherein movement of said actuator which disarms arms said mechanism is operable to disengage said first protection contact with said alternate supply contact and to disengage said inlet contact with said alternate protection contact.

* * * * *